US008412100B2

(12) United States Patent
Sanguino et al.

(10) Patent No.: US 8,412,100 B2
(45) Date of Patent: Apr. 2, 2013

(54) WIRELESS COMMUNICATION SYSTEM USING CUSTOM EARMOLD

(75) Inventors: Jorge F. Sanguino, Hopkins, MN (US); Randall W. Roberts, Eden Prairie, MN (US)

(73) Assignee: Micro Ear Technology, Inc., Plymouth, MN (US)

( * ) Notice: Subject to any disclaimer, the term of this patent is extended or adjusted under 35 U.S.C. 154(b) by 0 days.

(21) Appl. No.: 13/245,347

(22) Filed: Sep. 26, 2011

(65) Prior Publication Data

US 2012/0163640 A1 Jun. 28, 2012

Related U.S. Application Data

(63) Continuation of application No. 11/692,763, filed on Mar. 28, 2007, now Pat. No. 8,027,638.

(60) Provisional application No. 60/743,931, filed on Mar. 29, 2006.

(51) Int. Cl.

| | |
|---|---|
| ***H04B 7/00*** | (2006.01) |
| ***H04B 1/034*** | (2006.01) |
| ***H04M 1/00*** | (2006.01) |
| ***H04R 25/00*** | (2006.01) |
| ***H04R 9/08*** | (2006.01) |

(52) U.S. Cl. .................... 455/41.2; 455/100; 455/575.1; 455/575.2; 455/575.6; 381/23.1; 381/312; 381/322; 381/328; 381/362; 381/366

(58) Field of Classification Search ................. 370/41.2, 370/66.1, 557–558, 556.1, 569.1, 575.6; 381/23.1, 312–315, 321–323, 326, 328–331, 381/301, 324, 333, 380–382, 361–362, 366; 379/52, 55.1; 455/41.2–41.3, 90.3, 100, 455/557, 566–567, 569.1, 570, 575.1–575.2, 455/575.6, 575.8

See application file for complete search history.

(56) References Cited

U.S. PATENT DOCUMENTS

| | | | | |
|---|---|---|---|---|
| 2,596,351 | A * | 5/1952 | Weaver | 181/135 |
| 2,930,856 | A * | 3/1960 | Toht | 381/330 |
| 5,321,757 | A * | 6/1994 | Woodfill, Jr. | 381/312 |
| 5,430,801 | A * | 7/1995 | Hill | 381/322 |
| 5,715,321 | A * | 2/1998 | Andrea et al. | 381/92 |
| 6,154,546 | A * | 11/2000 | Uvacek | 381/60 |
| 6,473,512 | B1 * | 10/2002 | Juneau et al. | 381/328 |
| 6,831,988 | B2 * | 12/2004 | Vonlanthen | 381/323 |
| 7,139,404 | B2 * | 11/2006 | Feeley et al. | 381/330 |
| 7,149,552 | B2 * | 12/2006 | Lair | 455/569.1 |
| 7,257,372 | B2 * | 8/2007 | Kaltenbach et al. | 455/41.2 |
| 7,424,124 | B2 * | 9/2008 | Shennib et al. | 381/328 |
| 7,465,867 | B2 * | 12/2008 | Glatt | 84/645 |
| 7,519,194 | B2 * | 4/2009 | Niederdrank et al. | 381/330 |
| 7,570,777 | B1 * | 8/2009 | Taenzer et al. | 381/381 |
| 7,620,429 | B1 * | 11/2009 | Frerking et al. | 455/569.1 |
| 7,813,762 | B2 * | 10/2010 | Sanguino et al. | 455/557 |
| 8,027,638 | B2 * | 9/2011 | Sanguino et al. | 455/41.2 |
| 8,032,079 | B2 * | 10/2011 | Schneider et al. | 455/11.1 |
| 8,204,435 | B2 * | 6/2012 | Seshadri et al. | 455/41.2 |
| 2002/0132585 | A1 * | 9/2002 | Palermo et al. | 455/41 |

(Continued)

*Primary Examiner* — Meless Zewdu

(74) *Attorney, Agent, or Firm* — Schwegman, Lundberg & Woessner, P.A.

(57) ABSTRACT

An apparatus for an ear of a user comprising a custom-fitted, in-the-ear earmold, receiver electronics detachably connected to the earmold and amplifier electronics detachably and electrically connected to the receiver electronics. In some embodiments, the amplifier electronics include a wireless communications module with wireless communications electronics disposed in the wireless communications module, wherein the wireless communications electronics support wireless communications between the user and a device. Such teachings in various examples are applied to occluding and non-occluding hearing device embodiments. Additional systems and apparatus can be found in the specification and as provided by the attached claims and their equivalents.

17 Claims, 16 Drawing Sheets

U.S. PATENT DOCUMENTS

2003/0133582 A1* 7/2003 Niederdrank ................. 381/315
2004/0136555 A1* 7/2004 Enzmann ...................... 381/314
2004/0141628 A1* 7/2004 Villaverde et al. ............ 381/381
2004/0196996 A1* 10/2004 Feitel ............................ 381/322
2005/0031145 A1* 2/2005 Maltan et al. ................. 381/312
2005/0084124 A1* 4/2005 Tien .............................. 381/315
2007/0014423 A1* 1/2007 Darbut et al. ................. 381/330

* cited by examiner

WIRELESS COMMUNICATION SYSTEM USING CUSTOM EARMOLD

INCORPORATIONS BY REFERENCE

This application is a continuation of and claims the benefit of priority under 35 U.S.C. 120 to U.S. patent application Ser. No. 11/692,763, filed Mar. 28, 2007, which claims the benefit under 35 U.S.C. 119(e) to U.S. Provisional Patent Application Ser. No. 60/743,931, filed Mar. 29, 2006, the benefit of priority of each of which is claimed hereby, and each of which are incorporated by reference herein in its entirety.

This application incorporates by reference each of the following in their entirety: U.S. Provisional Patent Application Ser. No. 60/602,496, filed Aug. 18, 2004; U.S. patent application Ser. No. 11/207,591, filed Aug. 18, 2005; PCT Patent Application No. PCT/US2005/029971, filed Aug. 18, 2005; U.S. Provisional Patent Application Ser. No. 60/602,381, filed Aug. 18, 2005; U.S. patent application Ser. No. 11/207,555 filed Aug. 18, 2005; and PCT Patent Application No. PCT/US2005/029793, filed Aug. 18, 2005.

TECHNICAL FIELD

This disclosure relates to communication systems and in particular wireless communication systems using custom earmolds.

BACKGROUND

Headphones and ear buds for listening to sound are typically made from standard sized components to fit a number of listeners. Such devices are easy to manufacture, since of their components are standard sizes; however, they can offer poor fit and comfort, depending on the needs of a particular user. If adapted to be used for wired applications, such as an ear bud for a cell phone, the headphones are typically cumbersome to use and access to controls of the electronics sending the sound can be inconvenient.

What is needed in the art is an improved hearing communication system. The system should offer acceptable fit and comfort and should provide the user freedom from cumbersome connections and flexibility of use with other hardware.

SUMMARY

The above-mentioned problems and others not expressly discussed herein are addressed by the present subject matter and will be understood by reading and studying this specification.

The present subject matter provides apparatus and systems for wireless communication using an in-the-ear earmold custom fitted to a user's ear. In one example, the receiver is adapted to operate with the earmold, and the receiver is detachably and electrically coupled to amplifier electronics. In various examples, the amplifier electronics include wireless electronics. In various examples, the wireless electronics support a number of wireless protocols. In various examples, the receiver and the wireless electronics are integrated in the same housing. In various examples the apparatus does not include a microphone. Such teachings in various embodiments are applied to occluding and non-occluding hearing device embodiments.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Various embodiments are illustrated by way of example in the figures of the accompanying drawings.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1A:
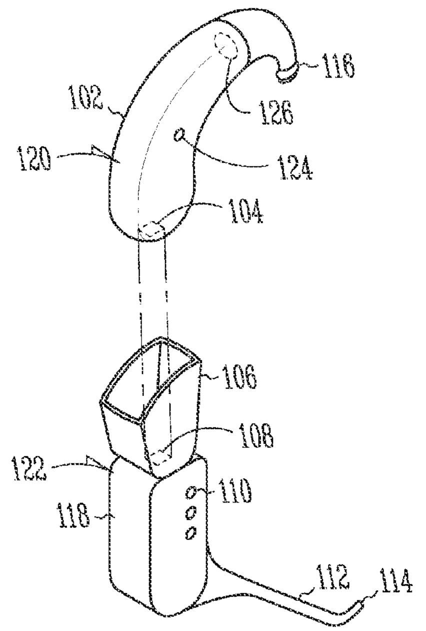
FIG. 1A illustrates a perspective view of a connected hearing assistance device and wireless communications adapter, according to one embodiment of the present subject matter.
Figure 1B:
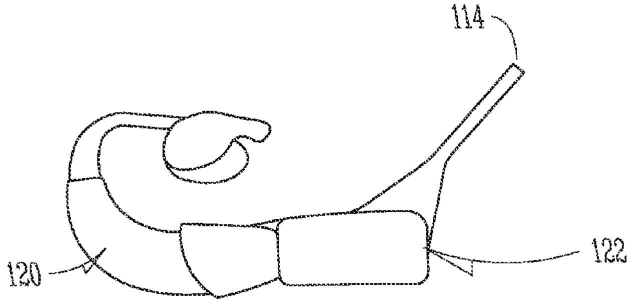
FIG. 1B illustrates a perspective view of a disconnected hearing assistance device and wireless communications adapter, according to one embodiment of the present subject matter.
Figure 1C:
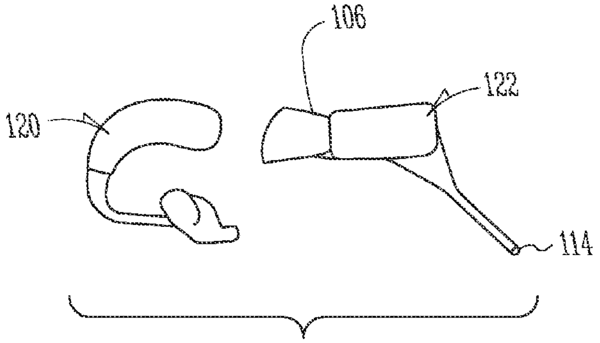
FIG. 1C illustrates a perspective view of a disconnected hearing assistance device and wireless communications adapter, according to one embodiment of the present subject matter.

FIGS. 1A-1C illustrate perspective views of a hearing assistance device 120 and wireless communications adapter 122, according to one embodiment of the present subject matter. The wireless communications adapter 122 is designed to connect to the hearing assistance device 120. In varying embodiments, a system for communicating wirelessly using an existing hearing assistance device 120 includes a hearing assistance device housing 102 sized for mating with a human ear, the mass of the hearing assistance device 120 supportable by the human ear. In one example, the hearing assistance device housing 102 is a self-powered behind-the-ear hearing assistance device. In the example, the hearing assistance device housing 102 includes hearing assistance device electronics, a hearing assistance device speaker 126, a hearing assistance device port 116 for transmitting sound to an earpiece, a hearing assistance device microphone 124 and a hearing assistance device connector 104.

The connector 104 provides for a wired connection in varying examples. In one embodiment, the connector 104 includes pads, such as gold plated metallic pads, suitable for forming multiple connections with terminals, such as spring-loaded pin-shaped terminals. However, in additional examples, the hearing assistance device connector 104 includes a mechanical lock. In various embodiments, the mechanical lock is releasable. In one example, the mechanical lock is constructed to support the weight of a mating connector and its associated components.

In one embodiment, the hearing assistance device connector 104 is a Direct Audio Input (DAI) type connector 104. In some varying designs, a connector is formed to mate with the DAI connector which includes a "boot" 106 that surrounds at least a portion of the DAI connector. In embodiments involving behind-the-ear hearing aids, the boot may also mechanically interface with the lower portion of the behind-the-ear hearing aid proximal the DAI connector. In varying embodiments the boot includes silicon or plastic. Such embodiments can be adapted to support at least some or all of the weight of the components attached to the boot. In various embodiments, the boot 106 serves to improve comfort. The Direct Audio Input connector, in varying embodiments, is connected to hearing assistance device electronics which control various functional aspects of hearing assistance device.

Mateable to the hearing assistance device 120 is a wireless communications adapter 122. In varying embodiments, the wireless communications adapter 122 includes a wireless communications adapter connector 108 and a boot 106 which forms a mechanical connection with the hearing assistance device housing 102. In varying embodiments, the boot 106 and the connector 108 form components typical of DAI connector sets, however, the present subject matter is not limited to these variants. In varying examples, connector 108 combined with the boot 106 uses fricative cohesion, adhesives, elastic deformation of the boot, or any combination of these to form a mechanical connection with the hearing assistance device 120, with or without the assistance of the hearing assistance device connector 104. Although many embodiments use the boot 106, others do not, and, in general, the examples listed here should not be understood to be exhaustive or exclusive. Another embodiment without a boot is demonstrated in FIG. 5A and its related figures and description provided below.

The wireless communications adapter 122 includes a wireless communications adapter housing 118. The housing 118 contains wireless communications adapter electronics. In varying embodiments, the electronics operate independent of notification to a user. In various embodiments, information is communicated to the user using visual indicators 110, or other types of indicators. Additionally, some embodiments of the wireless communications adapter include a boom 112 and a wireless communications adapter microphone 114, the boom 112 extending away from the wireless communications adapter housing 118 to a distal end, the wireless communications adapter microphone 114 located at the distal end of the boom 112.

Figure 2:
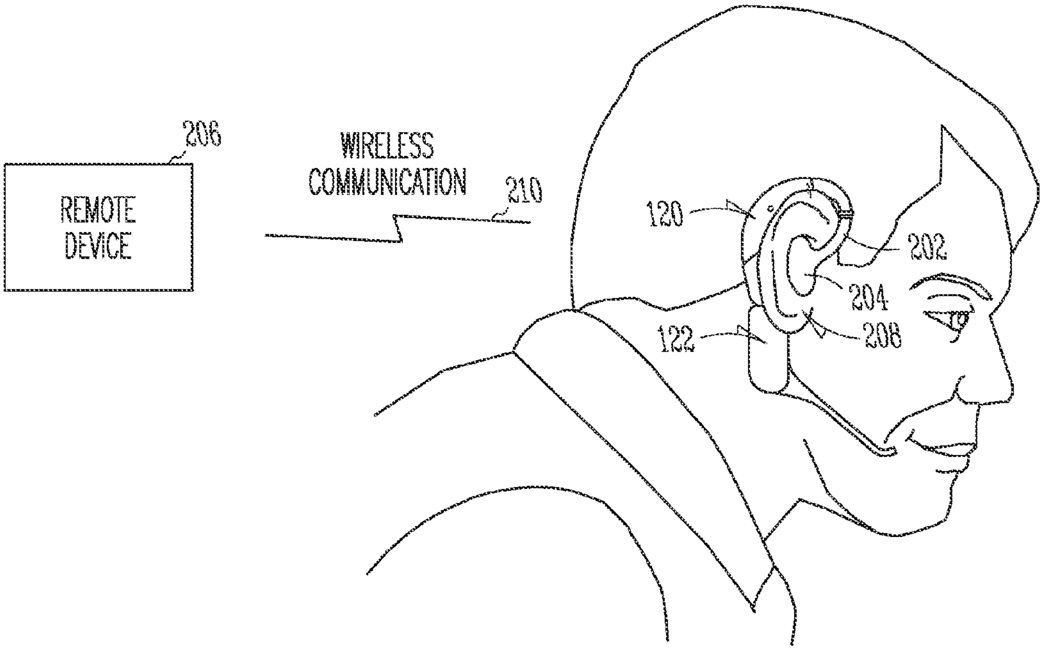
FIG. 2 illustrates a block diagram of a wireless communication system, according to one embodiment of the present subject matter.

FIG. 2 illustrates a block diagram of a wireless communication system, according to one embodiment of the present subject matter. FIG. 2 illustrates the hearing assistance device 120 connected to the wireless communications adapter 122, and further illustrates a connected hearing assistance device 120 and wireless communications adapter 122 mounted on an ear 208 of a user. In varying designs, the wireless communications adapter 122 and hearing assistance device 120 are sized for comfortable use on an ear 208, including aspects which restrict the mass of the apparatus. The illustration also demonstrates one embodiment of a tube 202 for conducting sound to an earpiece 204, the earpiece custom fitted to the user, which, in varying examples, allows for a standardized hearing assistance device 120. Other earpieces, such as vented designs, are contemplated without departing from the scope of the present subject matter.

The combined hearing assistance device 120 and wireless communications adapter 122 can communicate information 210 between the hearing assistance device 120 and a remote device 206. A variety of remote devices 206 can be employed. In one example, the remote device 206 is a cellular telephone capable of conducting BLUETOOTH compatible wireless communications. Other communications standards may be employed without departing from the scope of the present subject matter. Other types of communications are possible without departing from the scope of the present subject matter. Varying combinations of communications and communications standards may be employed without departing from the scope of the present subject matter.

In one embodiment, the wireless communications adapter is suited to communicate in far-field networks with one or more remote devices 206. Various remote devices 206 can be employed separately or in combination.

Figure 3A:
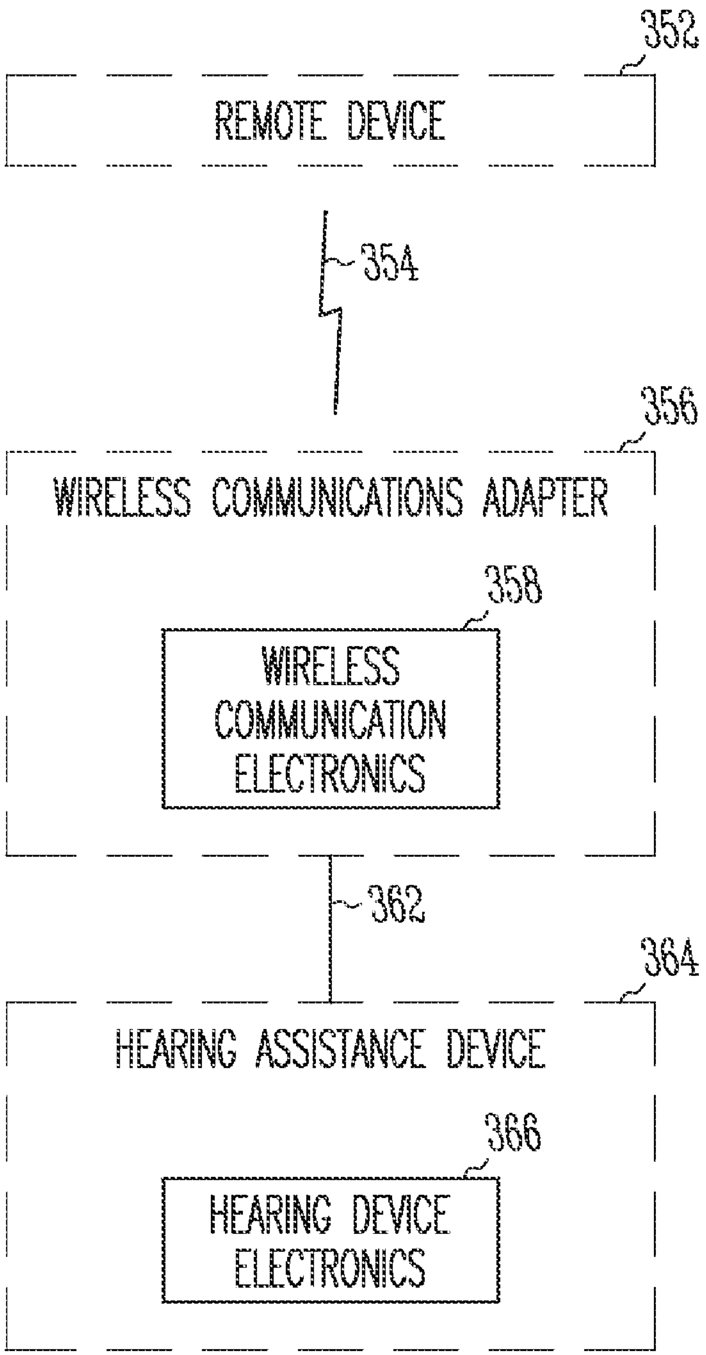
FIG. 3A illustrates a block diagrams for a wireless communications adapter and hearing assistance device, according to one embodiment of the present subject matter.

FIG. 3A illustrates a block diagram for a wireless communications adapter 356 and hearing assistance device 364, according to one embodiment of the present subject matter. In varying embodiments, the system includes a hearing assistance device 364 and electronics 366 connected to a wireless communications adapter 356. The connection 362 between the wireless communications adapter 356 and the hearing assistance device 364 is capable of relaying signals.

The wireless communications adapter includes, in some embodiments, wireless communication electronics 358 adapted for producing wireless communications 354 with a remote device 352. Wireless communications include electromagnetic communications, including far-field communications carrying digital signals. In one example, the wireless communication electronics 358 are adapted to provide BLUETOOTH communication with one or more remote devices.

Figure 3B:
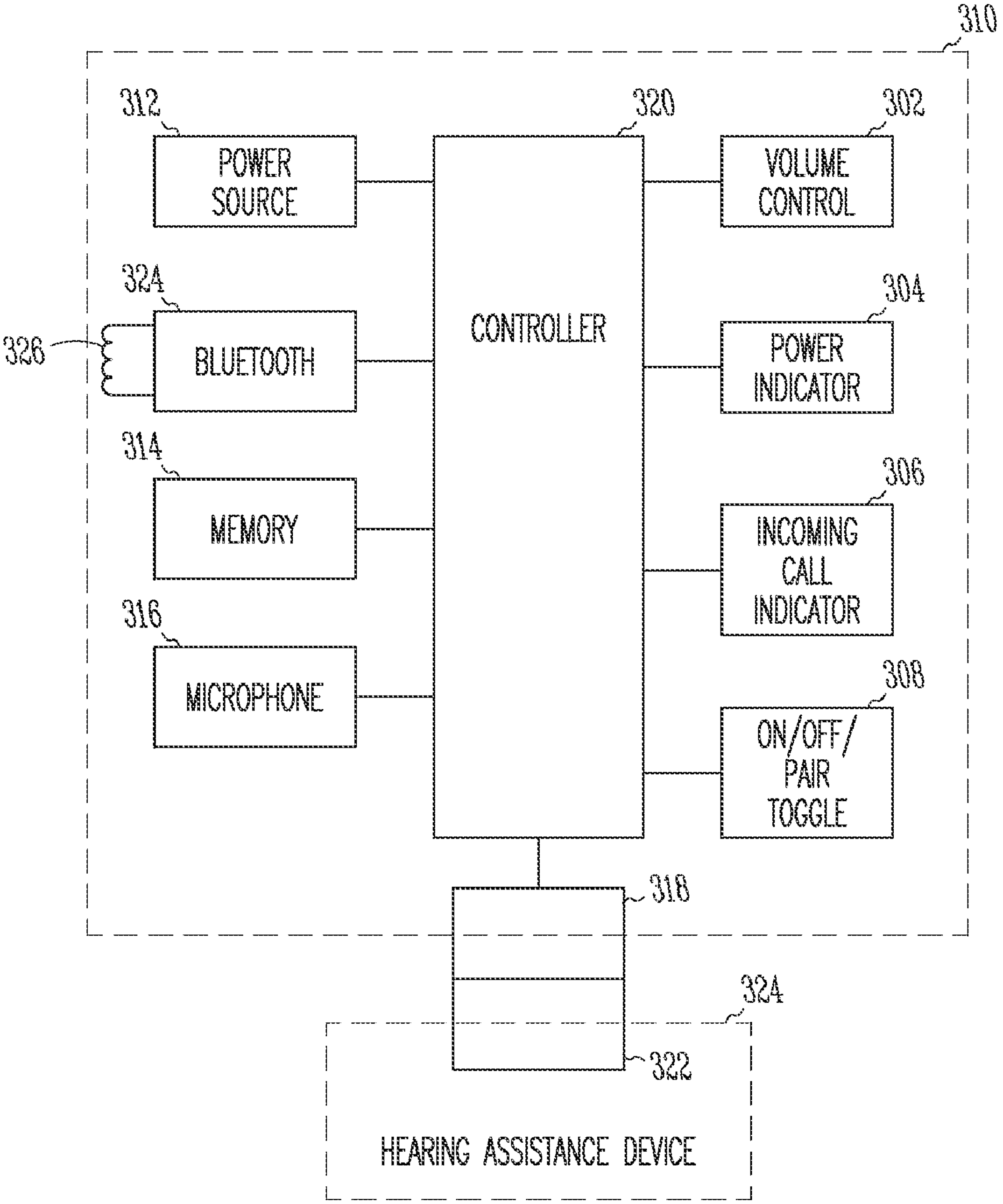
FIG. 3B illustrates a block diagrams for a wireless communications adapter and hearing assistance device, according to one embodiment of the present subject matter.

FIG. 3B illustrates a block diagram for a wireless communications adapter 310 and hearing assistance device 324, according to one embodiment of the present subject matter. In varying embodiments, the wireless communications adapter 310 includes a controller 320 which is adapted to control varying components within the wireless communications adapter 310. Additionally, the system includes a hearing assistance device 324, connected to the wireless communications adapter through the mated wireless communications adapter connector 318 and hearing assistance device connector 322.

In varying designs, the wireless communications adapter 310 includes a component 324 for producing wireless communications compatible with a BLUETOOTH network. In some examples, the BLUETOOTH wireless communicator includes an antenna 326 for use in wireless communications. In varying examples the antenna is part of a circuit board to which other components are mounted. In an additional embodiment, the wireless communications adapter includes an elongate microphone boom extending from the BLUETOOTH component 324, and the antenna 326 extends from the BLUETOOTH component into the microphone boom.

The wireless communications adapter 310, in varying examples, includes a power source 312. The power source 312, in varying embodiments, is a battery, such as a Lithium-ion Polymer battery.

In varying designs, the wireless communications adapter includes a volume control 302. In varying embodiments, gain for other components can also be controlled.

The wireless communications adapter consumes power, and varying designs benefit from components which indicate power remaining in a power source. For example, by including indicators 304, one design can inform a user how much power is remaining.

Additionally, varying embodiments include indicators representing other functional states. One example includes a multi-color LED which indicates that the BLUETOOTH transmitter 324 is powered, and an additional example indicates whether the BLUETOOTH transmitter 324 has been paired with another BLUETOOTH device.

Likewise, varying examples include components for representing the presence of data in the far field network. One example includes components for indicating that a call is pending, requiring a hearing assistance device user to decide if they should respond to the incoming call. In one design, the incoming call indicator includes an LED 306 for indicating that a call is incoming.

Varying designs require pairing the wireless communications adapter 310 with other devices. BLUETOOTH networks, for example, provide for the pairing of a plurality of devices. Some designs use a master device and a slave device, the master device serving to awake the slave device in instances where communication occurs. In varying designs, pairing is facilitated by one or more push buttons 308. In one design, a button 308 is located on the wireless communications adapter 310.

Information such as volume, pairing, and other information, can be stored in a memory 314. In varying embodiments, the memory is useful to store operational parameters, such as volume and status. In varying embodiments, the memory 314 is useful for storing application data. Application data may include, but is not limited to, processing instructions, communications instructions, and multimedia processing instructions.

Controller 320 facilitates interoperability of the wireless communications adapter components. Controller 320 is also capable of interfacing with microphone electronics which can be used to receive audio signals for use with a hearing assistance device. Such audio signals may also be transmitted wirelessly to another device. In one application, the audio signals are speech from the wearer of the device, which can be relayed by the wireless electronics to another device. Such a system is highly programmable, depending on the application and particular hearing assistance devices employed. It is understood that there are some embodiments which may not include microphone 316.

Figure 4:
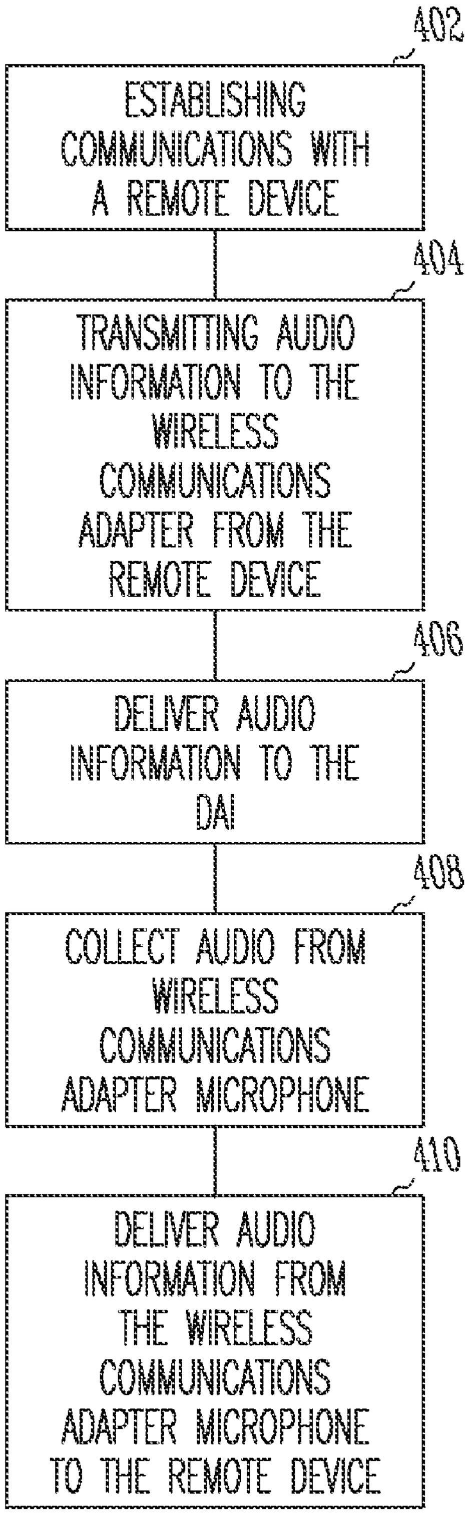
FIG. 4 illustrates a flowchart for operation of a wireless communications adapter used to relay wireless communication, according to one embodiment of the present subject matter.

FIG. 4 illustrates a flowchart for operation of a wireless communications adapter used for wireless communication, according to one embodiment of the present subject matter. In one embodiment, the wireless communications adapter establishes communications with a remote device 402. The remote device transmits audio information to the wireless communications adaptor 404, which is then delivered to the DAI 406. Where an embodiment includes a microphone, audio from the microphone will be transmitted by the wireless communications adapter to the remote device 408. Such communications are optional and may bypass the hearing assistance device and travel to the remote device 410. It should be noted that varying communications and combinations are possible without departing from the present teachings.

Figure 5A:
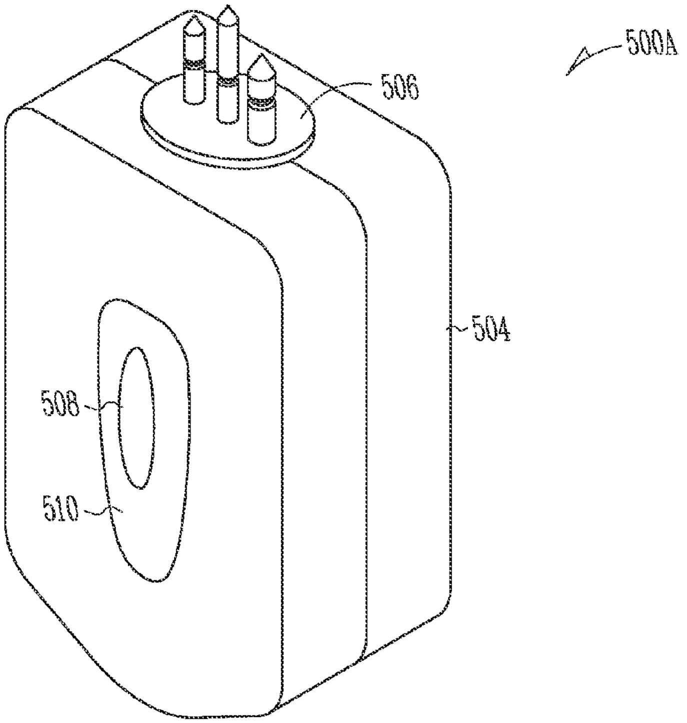
FIG. 5A illustrates a perspective view of one embodiment of a wireless communications adapter, according to one embodiment of the present subject matter.
Figure 5B:
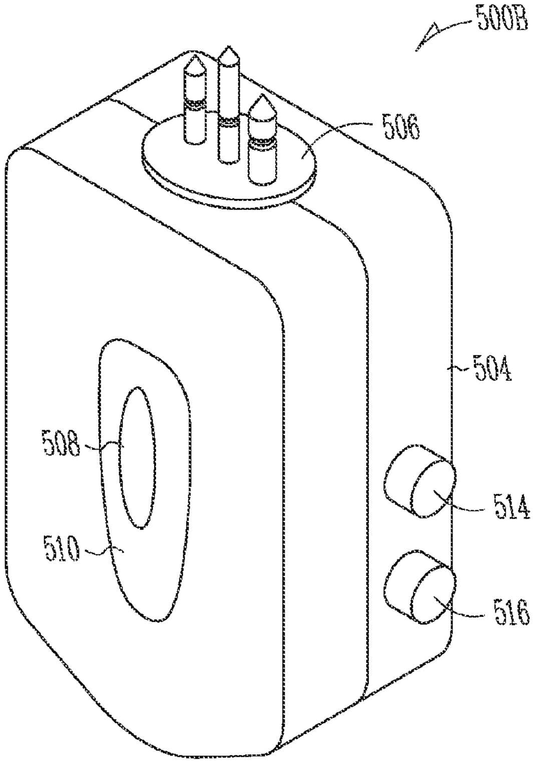
FIG. 5B illustrates a perspective view of one embodiment of a wireless communications adapter, according to one embodiment of the present subject matter.

FIG. 5A illustrates a perspective view of one embodiment of a wireless communications adapter, according to one embodiment of the present subject matter. In one embodiment, the wireless communications adapter 500A includes a DAI connector 506. In some embodiments, the connector 506 may be adjustable so that it can swivel to position the wireless communications adapter 500A at different angles to the device connected to connector 506. In various embodiments, the wireless communication adapter 500A includes a housing 504 including one or more buttons 510 to perform functions. The wireless communication adapter 500A, in various embodiments, also includes one or more indicators 508 to indicate aspects of the operation of the device. Placement and types of buttons and indicators may vary without departing from the scope of the present subject matter. FIG. 5B illustrates another variation of a wireless communications adapter

500B including the aspects set forth for wireless communications adapter 500A and including an optional volume control 514 and an optional power port 516. The position and types of volume control 514 and power port 516 may vary without departing from the scope of the present subject matter.

Thus, the wireless communications adapter may be embodied in several designs having varying form factors and features without departing from the scope of the present subject matter.

Figure 6A:
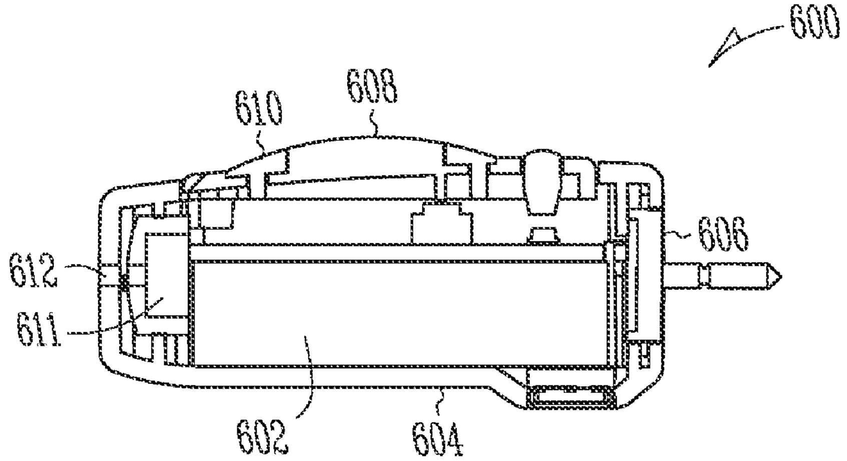
FIG. 6A is a cross sectional view of one embodiment of a wireless communications adapter, according to one embodiment of the present subject matter.
Figure 6B:
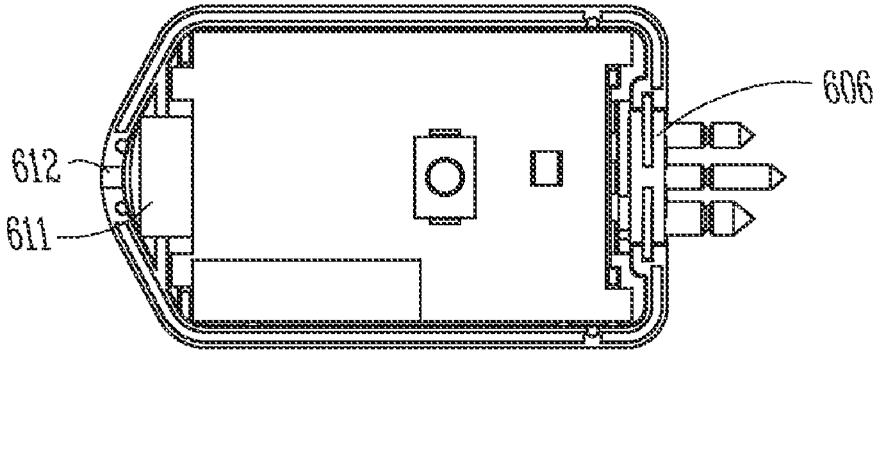
FIG. 6B is a cross sectional view of one embodiment of a wireless communications adapter, according to one embodiment of the present subject matter.

FIG. 6A is a cross sectional view of one embodiment of a wireless communications adapter 600, according to one embodiment of the present subject matter. The cross section of wireless communications adapter 600 shown in FIG. 6A provides housing 604 for housing a battery 602 and a microphone 611. The microphone hole 612 allows sound to reach the microphone 611. Indicator 608 is optionally connected to button 610 which is accommodated by housing 604. Connector 606 is also accommodated by housing 604. Other electronics can be included within the housing as exemplified by FIG. 3B. FIG. 6B is another cross sectional view of one embodiment of a wireless communications adapter, according to one embodiment of the present subject matter. FIG. 6B shows placement of microphone 611, microphone hole 612, and connector 606 according to one embodiment of the present subject matter. Other configurations and shapes and subcomponents are possible without departing from the scope of the present subject matter. Some embodiments may exist which do not include a microphone. Although a DAI connector is demonstrated, it is understood that other connectors can be employed in various embodiments of the present subject matter.

Figure 9:
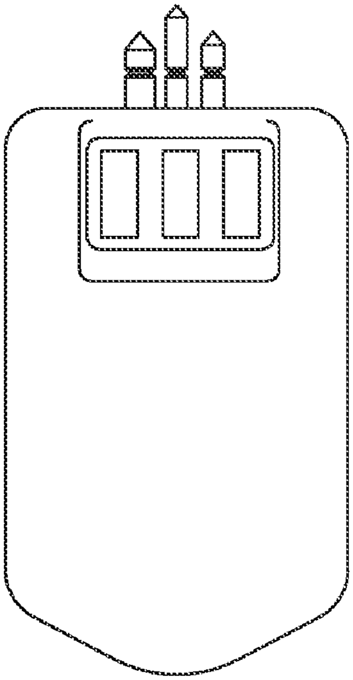
FIG. 9 shows a back view of one example of a wireless communications adapter according to one embodiment of the present subject matter.

In various embodiments of the present wireless communications adapter, the battery is rechargeable. In such embodiments, the wireless communications adapter can include contacts for charging. One example of such contacts is shown in FIG. 9. In some embodiments, the wireless communications adapter includes an optional charging port.

Figure 7A:
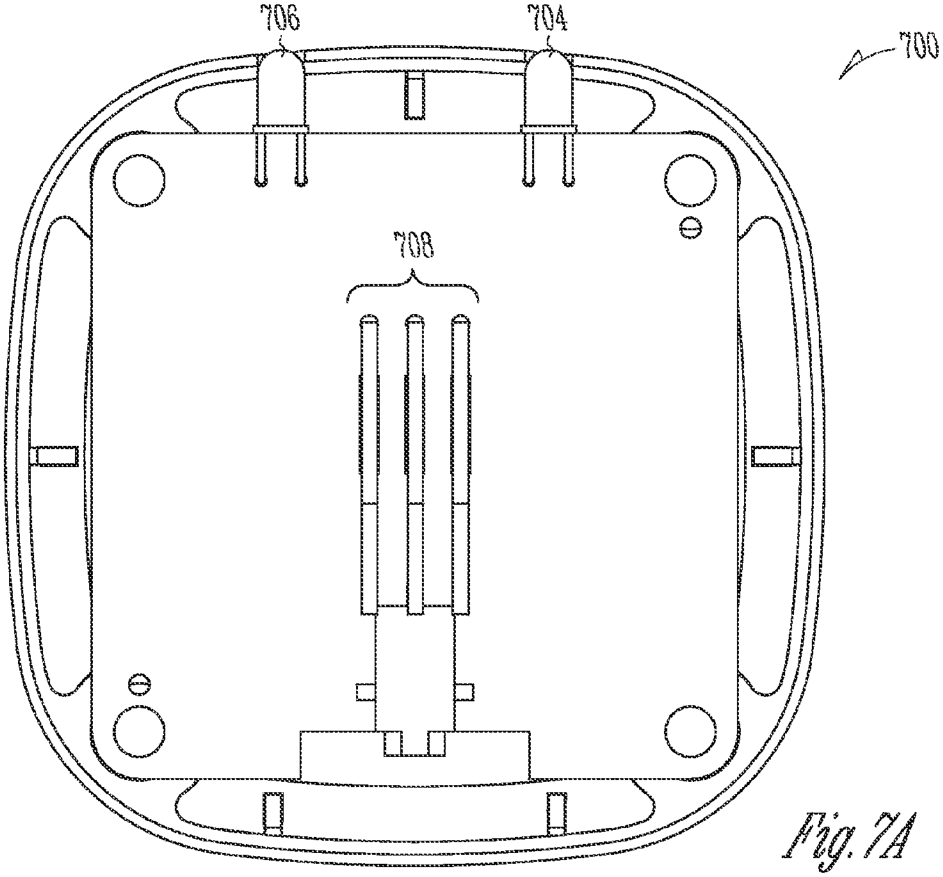
FIG. 7A is a cross sectional view of one embodiment of a charger for a wireless communications adapter, according to one embodiment of the present subject matter.
Figure 7B:
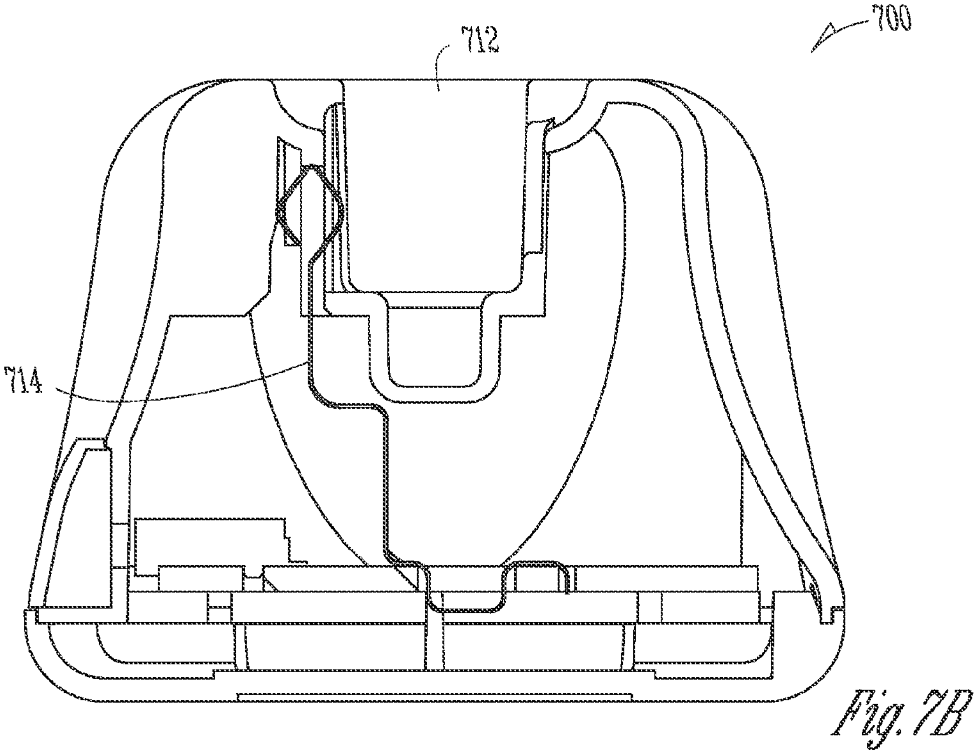
FIG. 7B is a cross sectional view of one embodiment of a charger for a wireless communications adapter, according to one embodiment of the present subject matter.

FIG. 7A is a cross sectional view of one embodiment of a charger for a wireless communications adapter, according to one embodiment of the present subject matter. Charger 700 includes LEDs 704 and 706 to indicate status concerning the charging of the device. Contacts 708 receive power for charging from a power supply. One approach is the use of a transformer and wall plug-in which is fed to the charger 700. FIG. 7B is a cross sectional view of one embodiment of a charger for a wireless communications adapter, according to one embodiment of the present subject matter. Contacts 714 are adapted to receive current from a power source plugged into charger 700 and provide them to a device inserted into opening 712 which as adapted to receive the device and bias contacts of the device against the contacts 714. Other configurations are possible without departing from the scope of the present subject matter.

Figure 8:
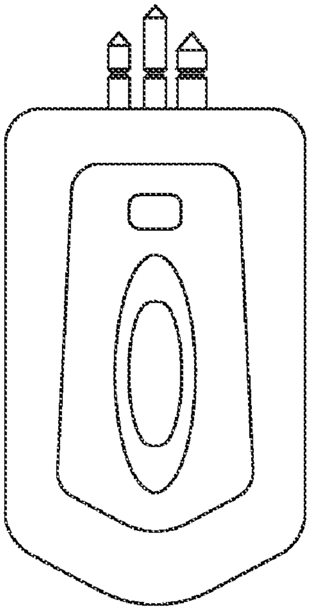
FIG. 8 shows a front view of one example of a wireless communications adapter according to one embodiment of the present subject matter.

FIG. 8 shows a front view of one example of a wireless communications adapter according to one embodiment of the present subject matter. In the embodiment shown, the indicator light is separate from the button. Multiple colored lights may be employed to provide various status information from a single indicator opening. Other arrangements are possible without departing from the scope of the present subject matter.

FIG. 9 shows a back view of one example of a wireless communications adapter according to one embodiment of the present subject matter. The contacts for charging in embodiments including rechargeable batteries are shown. Other arrangements are possible without departing from the scope of the present subject matter.

Figure 10:
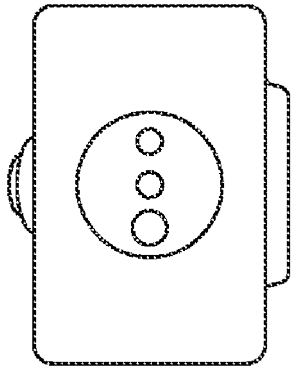
FIG. 10 shows a top view of one example of a wireless communications adapter according to one embodiment of the present subject matter.

FIG. 10 shows a top view of one example of a wireless communications adapter according to one embodiment of the present subject matter. In the embodiment shown, the DAI connector can swivel to provide varying angles of the wireless communications adapter with respect to the device it is connected to. Other arrangements are possible without departing from the scope of the present subject matter.

Figure 11:
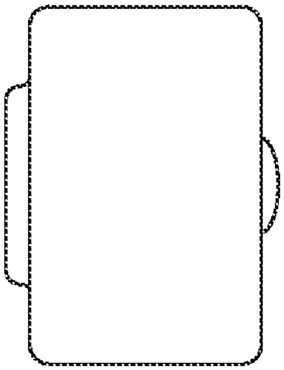
FIG. 11 shows a bottom view of one example of a wireless communications adapter according to one embodiment of the present subject matter.

FIG. 11 shows a bottom view of one example of a wireless communications adapter according to one embodiment of the present subject matter. The microphone hole is shown. Other arrangements are possible without departing from the scope of the present subject matter.

Figure 12:
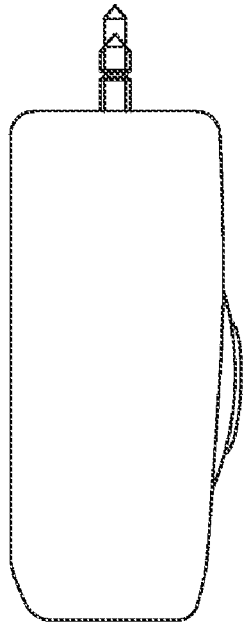
FIG. 12 shows a first side view of one example of a wireless communications adapter according to one embodiment of the present subject matter.
Figure 13:
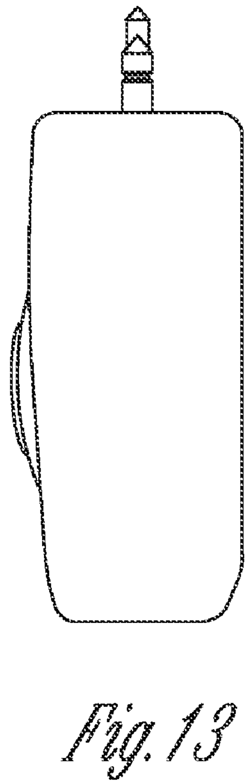
FIG. 13 shows a second side view of one example of a wireless communications adapter according to one embodiment of the present subject matter.

FIG. 12 shows a first side view of one example of a wireless communications adapter according to one embodiment of the present subject matter. FIG. 13 shows a second side view of one example of a wireless communications adapter according to one embodiment of the present subject matter. Other arrangements are possible without departing from the scope of the present subject matter.

In various embodiments, the wireless communications adapter can take on a variety of shapes and weights. For one example, the wireless communications adapter is in an almond shape with length of about 27 mm, width of about 15 mm, and thickness of about 10 mm. In one example, the case is plastic and the assembly has a weight of about 10 grams.

Various types of functions can be performed with a single button. For instance, it can be used to switch the device on and off. It can also be used for pairing or multi pairing by holding the button for a predetermined amount of time when in proximity to a device or devices to be paired with. The device can be used in conjunction with activation of voice recognition on a mobile phone. For instance, a mobile phone supporting a BLUETOOTH compatible communications mode. The button can also be used for a reconnection request (for example, after switch off/on sequence).

Volume control can be accomplished using software settings. It can also be accomplished using devices in communications with the wireless communications adapter. In embodiments having an optional volume control, the volume control can be used to adjust volume.

Some embodiments employ a dual color LED (red and blue) to state the charge, end of charge, low battery, stand-by, and other communication features.

The system can be used in conjunction with a cell phone to take a call, end a call, switch the communication on the phone, and/or switch the communication from the phone to the headset. Additional features are supported with a hands free profile, such as rejection of a call, or second call waiting.

In various embodiments a dedicated sound in the speaker is provided for low battery, switch on, switch off, pairing, voice activation, reconnection request, and waiting call.

Different battery designs can be employed without departing from the scope of the present subject matter. In one example, a lithium polymer battery is used. Some such designs feature a current capacity of about 100 mA. Some such designs can be recharged in less than 2 hours when depleted.

In various embodiments, the charging circuit includes short circuit protection and overheating protection.

In various embodiments the wireless communications adapter includes power management features. Such features include, but are not limited to, special designs to control the current consumption transmission auto adaptive according to the distance of the mobile, deep sleep implemented, and HV1, HV2 and HV3 (very low power consumption) depending the mobile phone.

Depending on the features provided and overall design, it is possible to construct units having a standby time of at least 300 hours and a talk time of about 3 to 4 hours. Such designs have varying power consumption. Some such designs have consumption of around 2.5 μA in standby mode, and up to 50 mA in full power. Other designs will vary.

Communications of far field signals are supported. Some embodiments employ 2.4 GHz communications. In various embodiments the wireless communications can include standard or nonstandard communications. Some examples of standard wireless communications include, but are not limited to, BLUETOOTH™, IEEE 802.11 (wireless LANs) wi-fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

In some embodiments, when connected to a hearing assistance device, the speaker will use the Direct Audio Input. In one embodiment, the microphone is an omnidirectional microphone. Other embodiments having more than one sound hole are possible which employ microphones capable of directional reception. Such designs include omnidirectional and directional modes.

In various embodiments, the hardware employed is that as specified by INNOVI (Innovi Technologies Limited). Other embodiments are possible without departing from the scope of the present subject matter.

In various embodiments, the wireless communications adapter will support BLUETOOTH Mobile/Headset adapter software. For instance, some embodiments are compatible with class 2 BLUETOOTH headset operation. Other types of software can be supported. Other arrangements are possible without departing from the scope of the present subject matter.

In various embodiments the one or more buttons act as a master control. In various embodiments, the master control can turn the wireless communications adapter on and off, pair it with a cell phone or other devices, answer incoming calls, reject incoming calls, and hang up on calls.

Figure 14:
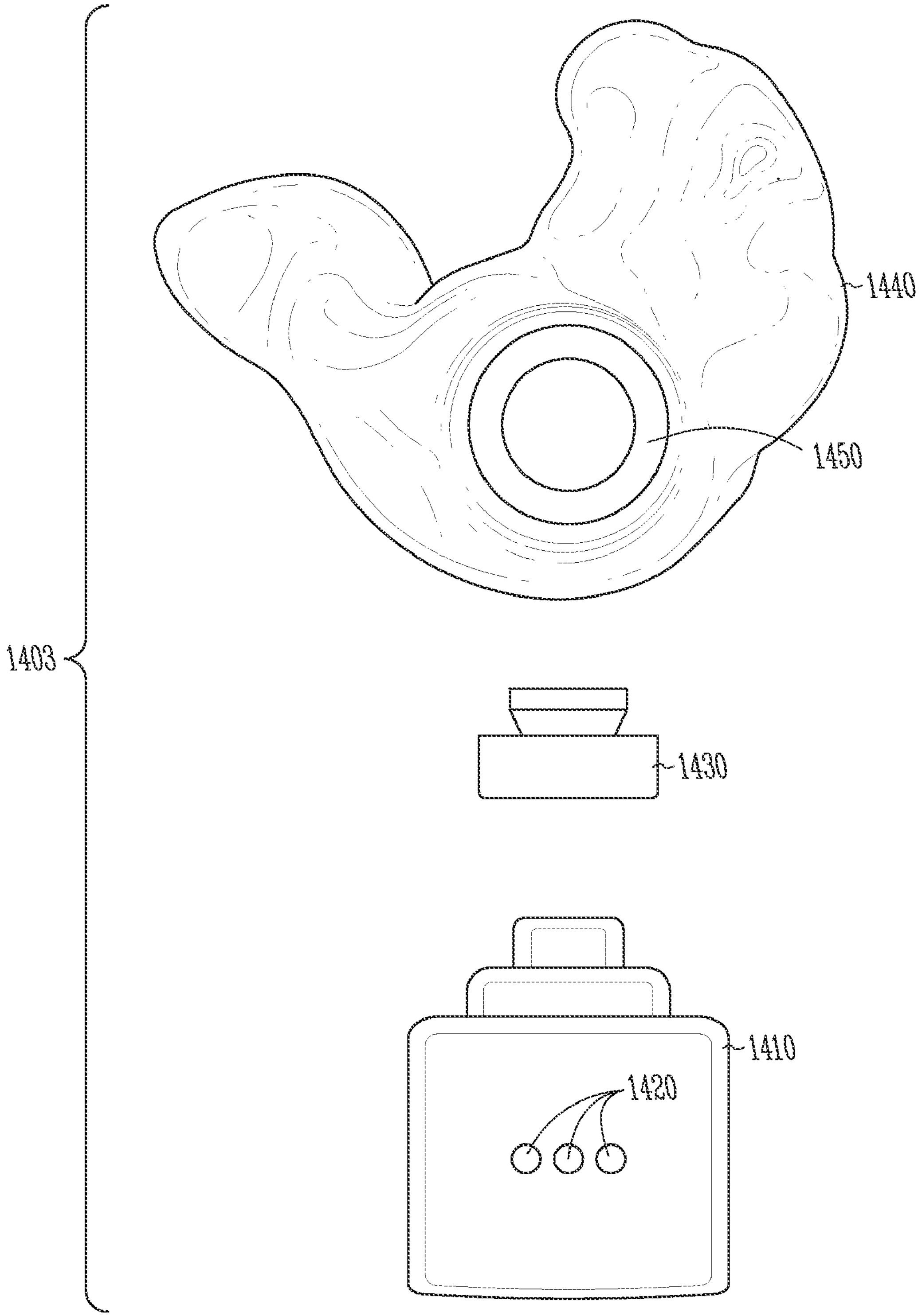
FIG. 14 shows an exploded view of an earmold hardware used to provide a communication port for the wireless communications adapter, according to one embodiment of the present subject matter.
Figure 18:
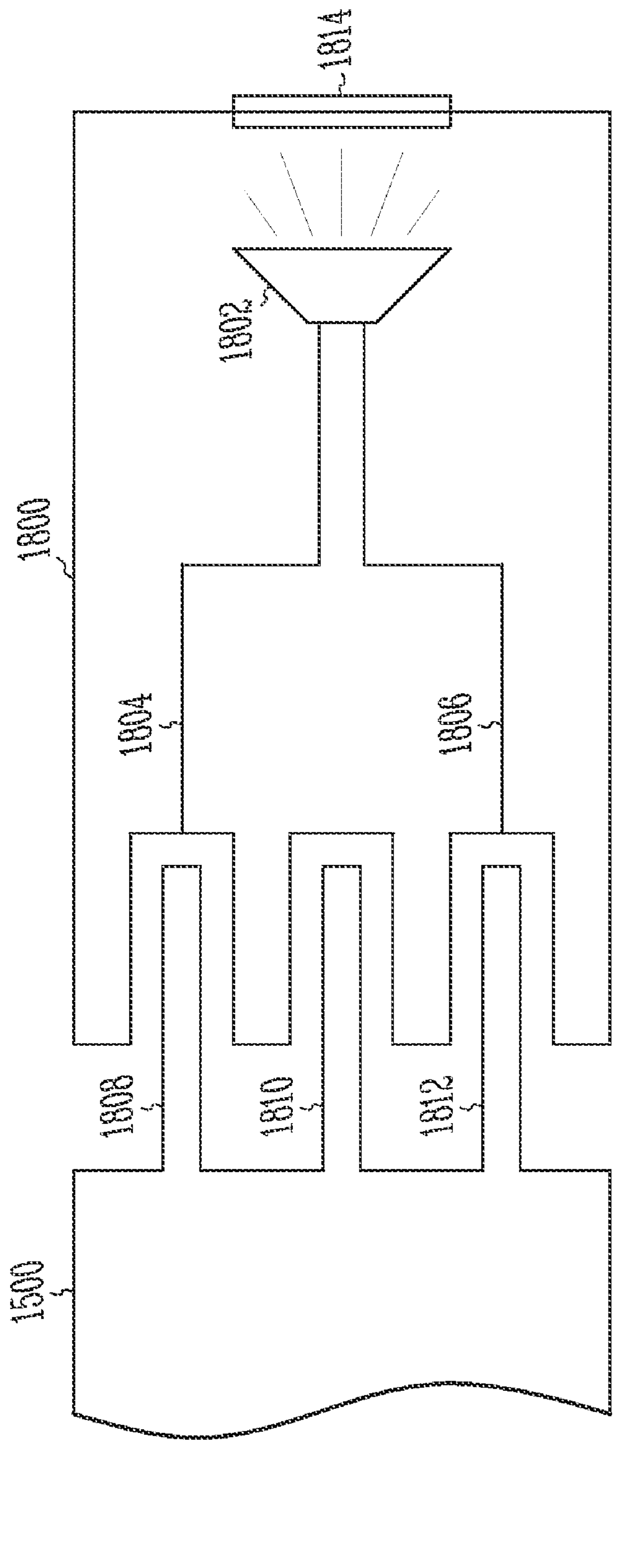
FIG. 18 shows the electrical connection of the DAI pins of the wireless communication adapter to module and their connection to receiver (speaker), according to one embodiment of the present subject matter.

FIG. 14 shows an exploded view of an earmold hardware 1403 used to provide a communication port for the wireless communications adapter, according to one embodiment of the present subject matter. In one embodiment, earmold 1440 is adapted for a custom fit to the ear of a user by any known means, including past, present and future earmold generation means. Earmold 1440 includes ring 1450 which is adapted to couple with coupler 1430. In one embodiment, the ring 1450 is a friction fit. In one embodiment, ring 1450 is a threaded fit. Other attachments for fitting ring 1450 to coupler 1430 are possible without departing from the scope of the present subject matter. Coupler 1430 is also adapted to couple with module 1410. In one embodiment the coupling is a friction fit. In one embodiment the coupling is a threaded fit. Other couplings are possible without departing from the scope of the present subject matter. In various embodiments, the module 1410 is directly connected to earmold 1440 without coupler 1430. Module 1410 provides a socket 1420 for receiving the three DAI connector pins from the wireless communication adapter in various embodiments. Module 1410 includes a receiver (also known as a speaker), which receives a signal from the wireless communication adapter DAI pins and converts it into sound. FIG. 18 shows the electrical connection of the DAI pins 1808, 1810, 1812 of the wireless communication adapter 1500 to module 1800 and their connection to receiver (speaker) 1802 according to one embodiment of the present subject matter. In this example, DAI pin 1808 is connected to receiver 1802 via wire 1804 and DAI pin 1812 is connected to receiver 1802 via wire 1806.

Figure 15:
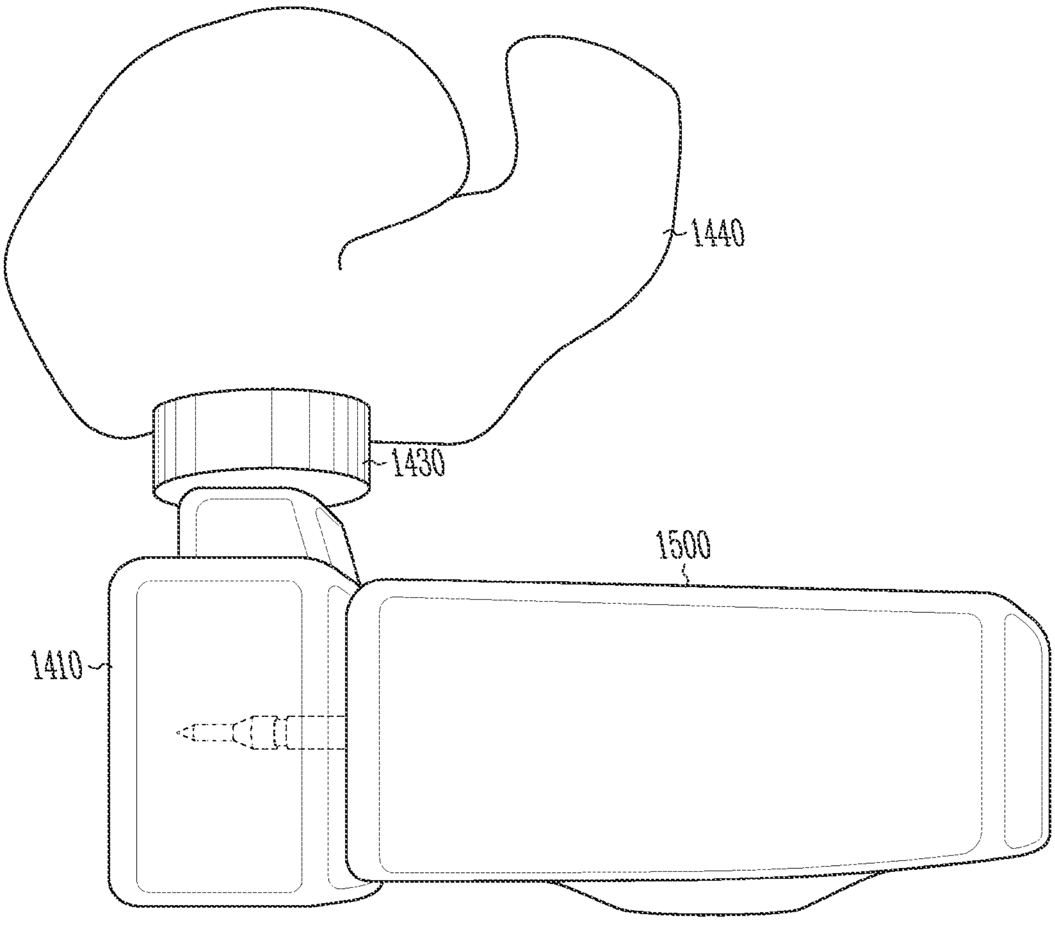
FIG. 15 shows a side view of the earmold hardware and wireless communications adapter, according to one embodiment of the present subject matter.

Sound emanates from the receiver 1802 and through an opening 1814 of the module 1800. In one embodiment the receiver 1802 is integral to the housing of module 1800 and outputs sound through an aperture of housing 1800. The receiver 1802 is oriented to project sound into earmold 1440. Other positions of the receiver 1802 are possible without departing from the scope of the present subject matter. In one embodiment, receiver 1802 is a Knowles 2389 receiver, by Knowles Electronics of Itasca, Ill. Other receivers may be used without departing from the scope of the present subject matter. The sound is fed into the earmold 1440, which is then heard by a wearer of the device. FIG. 15 shows a side view of the earmold hardware and wireless communications adapter, according to one embodiment of the present subject matter. Wireless communications adapter 1500 is shown having its DAI pins inserted into module 1410. Module 1410 is in turn connected to coupler 1430, which is in turn attached to the earmold 1440, in various embodiments. Various coupling schemes may be employed which provide rotation of the various components for comfortable fit. In various embodiments, the connection is performed without coupler 1430.

Figure 16:
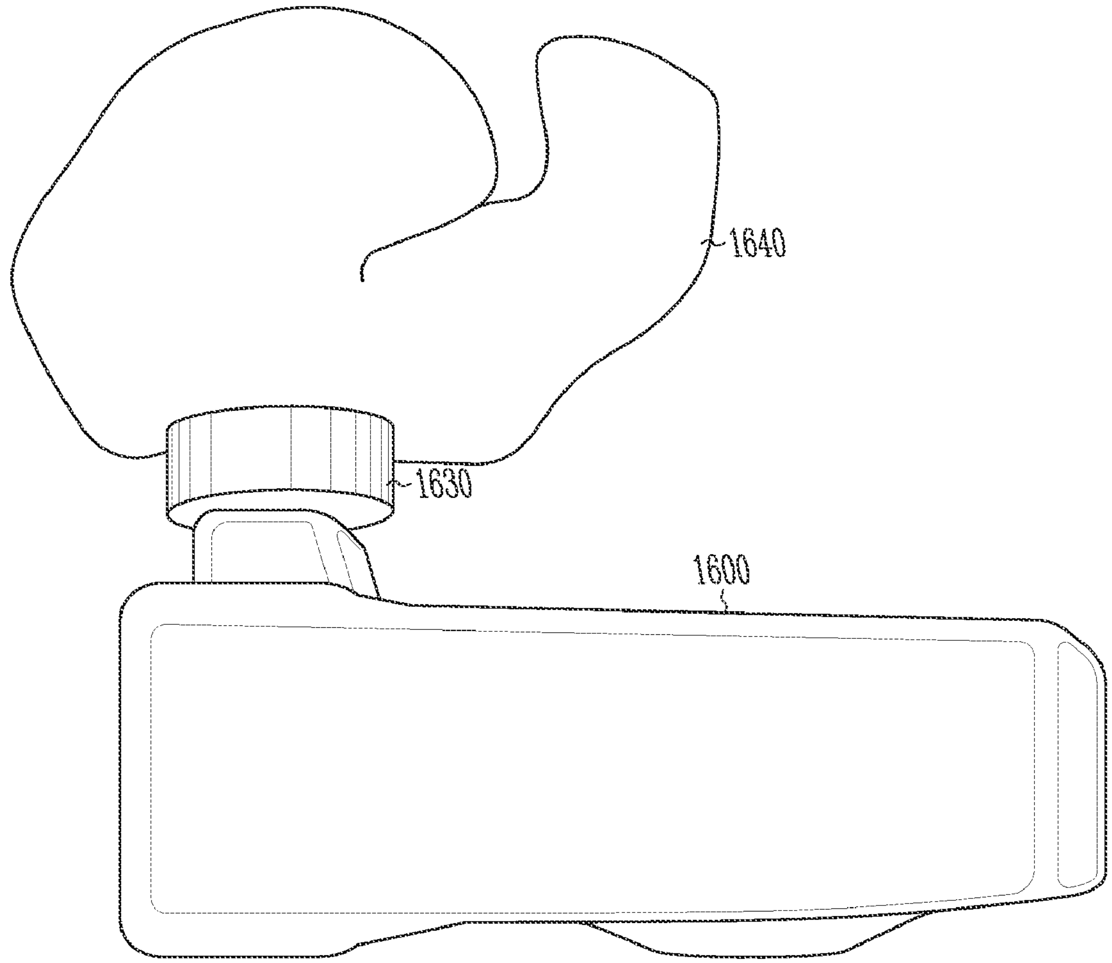
FIG. 16 shows a side view of the earmold hardware and wireless communications adapter, according to one embodiment of the present subject matter.

FIG. 16 shows a side view of earmold hardware and wireless communications adapter, according to one embodiment of the present subject matter. In this approach, the module 1410 and wireless communications adapter are integrated into one package 1600. FIG. 16 shows a coupler 1630 in one embodiment. In various embodiments, the coupler 1630 is optional and in some embodiments, wireless communications adapter 1600 is connected directly to earmold 1640.

Figure 17:
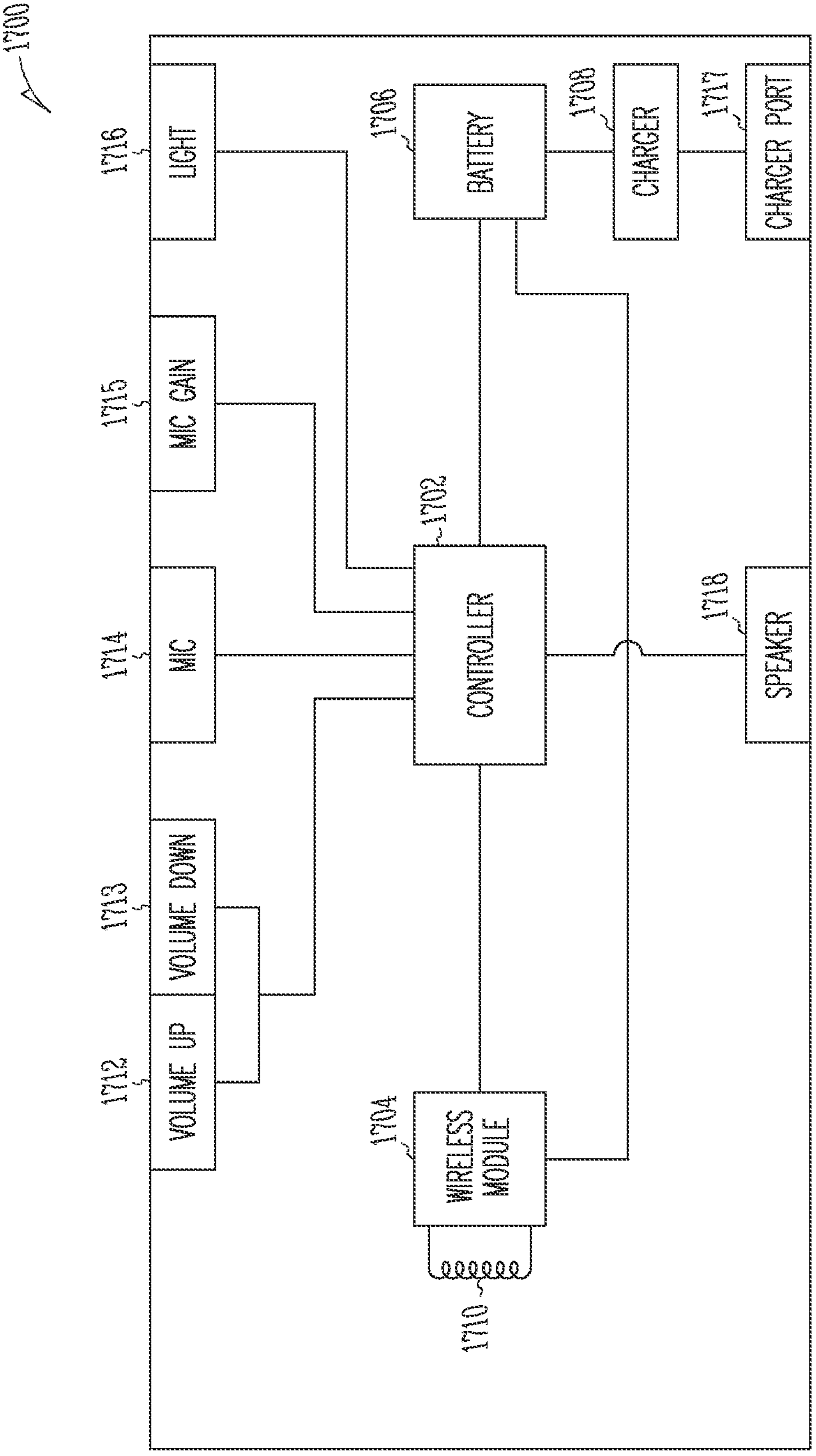
FIG. 17 shows a block diagram of the wireless communications adapter of FIG. 16, according to one embodiment of the present subject matter.

FIG. 17 shows a block diagram of the wireless communications adapter 1600 of FIG. 16, according to one embodiment of the present subject matter. In the embodiment shown in FIG. 17, controller 1700 coordinates activities by the wireless module 1704 and receives inputs from microphone 1714. In various embodiments, controller 1702 is a microprocessor. Other controller realizations utilizing combinations of hardware, software, and/or firmware are possible without departing from the scope of the present subject matter. In one embodiment, microphone 1714 is an omnidirectional microphone. In various embodiments microphone 1714 is a directional microphone providing various omnidirectional and directional modes of operation controllable by controller 1702. In various embodiments, more than one microphone is employed, providing various omnidirectional and directional modes of operation controllable by controller 1702. Microphone gain input 1715 is adapted to receive an input selection from a user for use by the controller 1702 to control microphone gain. In one embodiment, the microphone gain input 1715 receives a gain selection from a multi-position switch, in one embodiment microphone gain input 1715 receives a gain selection from a continuously variable input, such as potentiometer. Other microphone gain inputs are possible without departing from the scope of the present subject matter. Controller 1702 also communicates with light 1716 as an annunciator. The annunciator can serve a variety of communication functions, including, but not limited to, one or more of pairing, ringing, answering, connection, disconnection, charging and/or power status modes, for example. In one embodiment the light 1716 is a light emitting diode. In various embodiments, the light 1716 is a multicolor light emitting device to use different colors, patterns, and combinations of colors and patterns to indicate various modes and operations. Other annunciators may be employed without departing from the scope of the present subject matter. For example, sounds can be employed to indicate certain modes and operations.

Various communication protocols are supported by wireless module 1704, which is connected to antenna 1710. Communications of far field signals are supported in various embodiments. Some embodiments employ 2.4 GHz communications. In various embodiments the wireless communications can include standard or nonstandard communications. Some examples of standard wireless communications include, but are not limited to, BLUETOOTH™, IEEE 802.11 (wireless LANs) wi-fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

In the embodiment of FIG. 17, a charger port 1717 is employed which activates a charging circuit 1708 to charge battery 1706. In one embodiment, the charger port 1717 is a mini USB connector. Other connectors may be employed without departing from the scope of the present subject matter. The battery 1706 powers controller 1702 and 1704 in various embodiments. Other devices may be powered by battery 1706 including, but not limited to microphone 1714, speaker 1718, and/or light 1716, for example. Such devices may also receive power from other components such as controller 1702, for example. Some embodiments employ a replaceable battery 1706 and do not require charging or a charger circuit 1708.

The embodiment of FIG. 17 also includes, optionally, specialized inputs such as a inputs for volume control 1712, 1713 which can be switches or potentiometers, and inputs for initiating or termination of use of the device, such as the talk input. Such switches provide the functionality of the wireless communications adaptor discussed herein, among other possible functionalities. The discussion above is referenced herein to include those functionalities.

The speaker 1718 can receive signals from the controller 1702. It is understood that the device 1700 can have a wireless module 1704 which supports reception, transmission, and combinations of reception and transmission.

In one application the present system provides a wireless interface to a user having a custom-fitted earmold adapted to receive signals from another wireless source. Such applications may include transmission of signals to that wireless source. The system can also support control signals between such devices to perform functions, including but not limited to, cellular telephone communications and reception of audio signals generally. In various embodiments the microphone gains and/or directionalities can be adjusted for user conditions. Thus, for example, in a crowded and noisy environment it may be desirable to reduce microphone gain for better reception of the user's voice as opposed to reception of room sounds and/or other noise.

Various forms of data can be communicated. For example, data such as voice data, streaming audio data, application data, and/or functional parameters, may be communicated with such a configuration. Other forms of data may be communicated without departing from the scope of the present subject matter.

Additionally, one of ordinary skill in the art will understand that, the systems shown and described herein can be implemented using software, hardware, and combinations of software and hardware. As such, the term "system" is intended to encompass software implementations, hardware implementations, and software and hardware implementations.

It is further understood that the principles set forth herein can be applied to a variety of hearing assistance devices, including, but not limited to occluding and non-occluding applications. Some types of hearing assistance devices which may benefit from the principles set forth herein include, but are not limited to, behind-the-ear devices, over-the-ear devices, on-the-ear devices, and in-the ear devices, such as in-the-canal and/or completely-in-the-canal hearing assistance devices. Other applications beyond those listed herein are contemplated as well.

It is to be understood that the above description is intended to be illustrative, and not restrictive. Thus, the scope of the present subject matter is determined by the appended claims and their legal equivalents.

What is claimed is:

1. An apparatus for an ear of a user, the apparatus comprising:

a hearing assistance device including a housing sized for mating with the ear of the user, the hearing assistance device housing including:
  a microphone;
  hearing assistance device electronics connected to the microphone, the hearing assistance device electronics including a digital signal processor (DSP);
  a speaker connected to the hearing assistance device electronics; and
  a connector; and a wireless communications adapter configured to detachably connect to the connector, wherein the wireless communications adapter includes:
  a controller;
  wireless communication electronics connected to the controller;
  a boot configured to form a mechanical connection with the hearing assistance device housing at a proximal end of the adapter; and
  a boom extending away from the wireless communications adapter at a distal end of the adapter, the boom including a wireless communications adapter microphone connected to the wireless communication electronics.

2. The apparatus of claim 1, wherein the hearing assistance device includes a non-occluding custom earmold.

3. The apparatus of claim 1, wherein the hearing assistance device includes a standardized earmold.

4. The apparatus of claim 3, wherein the standardized earmold includes a non-occluding standardized earmold.

5. The apparatus of claim 1, wherein the wireless communications adapter includes one or more visual indicators configured to communicate information to the user.

6. The apparatus of claim 5, wherein the one or more visual indicators includes a light emitting diode (LED).

7. The apparatus of claim 5, wherein the one or more visual indicators includes an annunciator configured for communications functions including one or more of pairing, ringing, answering, connection, disconnection, charging or power status mode.

8. The apparatus of claim 1, wherein the wireless communications adapter supports wireless 802.11 communications between the user and a device conducting 802.11 compatible communications.

9. The apparatus of claim 1, wherein the wireless communications adapter supports wireless 802.15 communications between the user and a device conducting 802.15 compatible communications.

10. The apparatus of claim 1, wherein the wireless communications adapter supports wireless 802.16 communications between the user and a device conducting 802.16 compatible communications.

11. The apparatus of claim 1, wherein the wireless communications adapter supports wireless 802.20 communications between the user and a device conducting 802.20 compatible communications.

12. The apparatus of claim 1, wherein the wireless communications adapter supports approximately 2.4 GHz wireless communications between the user and a device conducting approximately 2.4 GHz wireless communications.

13. The apparatus of claim 12, wherein the wireless communications adapter supports wireless Bluetooth communications between the user and a device conducting Bluetooth compatible communications.

14. The apparatus of claim 1, wherein the wireless communications adapter supports wireless CDMA communications between the user and a device conducting CDMA compatible communications.

15. The apparatus of claim 1, wherein the wireless communications adapter supports wireless GSM communications between the user and a device conducting GSM compatible communications.

16. The apparatus of claim 1, wherein the wireless communications adapter supports wireless ZigBee communications between the user and a device conducting ZigBee compatible communications.

17. The apparatus of claim 1, wherein the wireless communications adapter supports wireless ultra-wideband (MB) communications between the user and a device conducting UWB compatible communications.

* * * * *

UNITED STATES PATENT AND TRADEMARK OFFICE

CERTIFICATE OF CORRECTION

PATENT NO. : 8,412,100 B2
APPLICATION NO. : 13/245347
DATED : April 2, 2013
INVENTOR(S) : Sanguino et al.

It is certified that error appears in the above-identified patent and that said Letters Patent is hereby corrected as shown below:

In the Claims

In column 14, line 18, in Claim 17, delete "(MB)" and insert --(UMB)--, therefor Signed and Sealed this
Sixteenth Day of December, 2014

Michelle K. Lee
*Deputy Director of the United States Patent and Trademark Office*